United States Patent
Uyeki

(10) Patent No.: US 9,843,187 B2
(45) Date of Patent: Dec. 12, 2017

(54) SYSTEM AND METHOD FOR AGGREGATING ELECTRIC VEHICLE LOADS FOR DEMAND RESPONSE EVENTS

(71) Applicant: Honda Motor Co., Ltd., Tokyo (JP)

(72) Inventor: Robert M. Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 585 days.

(21) Appl. No.: 14/533,320

(22) Filed: Nov. 5, 2014

(65) Prior Publication Data

US 2016/0126732 A1    May 5, 2016

(51) Int. Cl.
  *H02J 3/00* (2006.01)
  *B60L 11/18* (2006.01)
  *H02J 13/00* (2006.01)

(52) U.S. Cl.
  CPC ............ *H02J 3/00* (2013.01); *B60L 11/1844* (2013.01); *B60L 11/1846* (2013.01); *H02J 13/001* (2013.01); *B60L 11/1838* (2013.01); *H02J 2003/003* (2013.01); *Y02E 60/721* (2013.01); *Y02T 90/10* (2013.01); *Y02T 90/168* (2013.01); *Y04S 10/126* (2013.01); *Y04S 10/40* (2013.01); *Y04S 30/12* (2013.01)

(58) Field of Classification Search
  None
  See application file for complete search history.

(56) References Cited

U.S. PATENT DOCUMENTS

| | | | |
|---|---|---|---|
| 8,346,401 | B2 | 1/2013 | Pollack et al. |
| 8,571,955 | B2 | 10/2013 | Al Faruque et al. |
| 8,600,556 | B2 | 12/2013 | Nesler et al. |
| 2011/0202192 | A1 | 8/2011 | Kempton |
| 2011/0276194 | A1 | 11/2011 | Emalfarb et al. |
| 2012/0235646 | A1 | 9/2012 | Lo et al. |
| 2012/0253567 | A1 | 10/2012 | Levy et al. |
| 2014/0354227 | A1 * | 12/2014 | Tyagi .................. B60L 11/1844 320/109 |

FOREIGN PATENT DOCUMENTS

WO        2014018504        1/2014

OTHER PUBLICATIONS

Article: Brooks, et al.: "Demand Dispatch—Using Real-Time Control of Demand to Help Balance Generation and Load", IEEE Power & Energy Magazine, May/Jun. 2010, pp. 20-29.
Article: Callaway, et al.: "Achieving Controllability of Electric Loads", Proceedings of the IEEE | vol. 99, No. 1, Jan. 2011, pp. 184-199.

* cited by examiner

*Primary Examiner* — Qing Wu
(74) *Attorney, Agent, or Firm* — Rankin, Hill & Clark LLP

(57) ABSTRACT

A computer-implemented method for aggregating electric vehicle loads for demand response events includes receiving a demand response (DR) event request from a utility system indicative of a DR event for an area. The DR event request includes at least one event parameter for participation in the DR event. The method includes determining a first original equipment manufacturer (OEM) DR event load for the area based on the DR event request and charging data received from electric vehicles associated with a first OEM. Upon determining the first original OEM DR event load does not meet the at least one event parameter, the method includes aggregating charging data from electric vehicles associated with a second OEM with the first OEM DR event load to determine an aggregated DR load for the area.

20 Claims, 4 Drawing Sheets

| ROW ID | VEHICLE ID | OEM ID | LOCATION | START SOC | CHARGE LEVEL | EST CHARGE TIME | CHARGE AMOUNT |
|---|---|---|---|---|---|---|---|
| 1 | 124a | FIRST OEM | SERVICE AREA 2 | 69% | L2 | 62 MINUTES | 5 kWh |
| 2 | 124b | FIRST OEM | SERVICE AREA 1 | 59% | L2 | 83 MINUTES | 12 kWh |
| 3 | 124c | FIRST OEM | SERVICE AREA 1 | 50% | L2 | 15 MINUTES | 9 kWh |

402

| ROW ID | VEHICLE ID | OEM ID | LOCATION | START SOC | CHARGE LEVEL | EST CHARGE TIME | CHARGE AMOUNT |
|---|---|---|---|---|---|---|---|
| 1 | 134a | SECOND OEM | SERVICE AREA 2 | 48% | L2 | 30 MINUTES | 13 kWh |
| 2 | 134b | SECOND OEM | SERVICE AREA 1 | 35% | L2 | 30 MINUTES | 20 kWh |
| 3 | 134c | SECOND OEM | SERVICE AREA 1 | 18% | L2 | 168 MINUTES | 14 kWh |

404

| ROW ID | VEHICLE ID | OEM ID | LOCATION | START SOC | CHARGE LEVEL | EST CHARGE TIME | CHARGE AMOUNT |
|---|---|---|---|---|---|---|---|
| 1 | 138a | THIRD OEM | SERVICE AREA 2 | 23% | L2 | 100 MINUTES | 10 kWh |
| 2 | 138b | THIRD OEM | SERVICE AREA 1 | 55% | L2 | 150 MINUTES | 15 kWh |
| 3 | 138c | FIRST OEM | SERVICE AREA 2 | 10% | L2 | 200 MINUTES | 20 kWh |

406

| ROW ID | VEHICLE ID | OEM ID | LOCATION | START SOC | CHARGE LEVEL | EST CHARGE TIME | CHARGE AMOUNT |
|---|---|---|---|---|---|---|---|
| 1 | 142a | FOURTH OEM | SERVICE AREA 2 | 32% | L2 | 100 MINUTES | 8 kWh |
| 2 | 142b | FOURTH OEM | SERVICE AREA 1 | 55% | L2 | 100 MINUTES | 15 kWh |
| 3 | 142c | FOURTH OEM | SERVICE AREA 2 | 11% | L2 | 150 MINUTES | 20 kWh |

| ROW ID | VEHICLE ID | OEM ID | LOCATION | START SOC | CHARGE LEVEL | EST CHARGE TIME | CHARGE AMOUNT | PRIORITY |
|---|---|---|---|---|---|---|---|---|
| 1 | 124b | FIRST OEM | SERVICE AREA 1 | 59% | L2 | 83 MINUTES | 12 kWh | 1 |
| 2 | 124c | FIRST OEM | SERVICE AREA 1 | 50% | L2 | 15 MINUTES | 9 kWh | 2 |
| 3 | 134b | SECOND OEM | SERVICE AREA 1 | 35% | L2 | 30 MINUTES | 20 kWh | 3 |
| 4 | 134c | SECOND OEM | SERVICE AREA 1 | 18% | L2 | 168 MINUTES | 14 kWh | 4 |

504

| ROW ID | VEHICLE ID | OEM ID | LOCATION | START SOC | CHARGE LEVEL | EST CHARGE TIME | CHARGE AMOUNT | PRIORITY |
|---|---|---|---|---|---|---|---|---|
| 1 | 124a | FIRST OEM | SERVICE AREA 2 | 69% | L2 | 62 MINUTES | 5 kWh | 1 |
| 2 | 134a | SECOND OEM | SERVICE AREA 2 | 48% | L2 | 30 MINUTES | 13 kWh | 2 |
| 3 | 138a | THIRD OEM | SERVICE AREA 2 | 23% | L2 | 100 MINUTES | 10 kWh | 4 |
| 4 | 138c | THIRD OEM | SERVICE AREA 2 | 10% | L2 | 200 MINUTES | 20 kWh | 6 |
| 5 | 142a | FOURTH OEM | SERVICE AREA 2 | 32% | L2 | 100 MINUTES | 8 kWh | 3 |
| 6 | 142c | FOURTH OEM | SERVICE AREA 2 | 11% | L2 | 150 MINUTES | 20 kWh | 5 |

FIG. 5

SYSTEM AND METHOD FOR AGGREGATING ELECTRIC VEHICLE LOADS FOR DEMAND RESPONSE EVENTS

BACKGROUND

Demand response programs offer incentives to electricity users to reduce their power use and/or change their power consumption pattern in response to a demand response event. A demand response event can be triggered by a utility's need for power due to a high, system-wide demand for electricity or emergencies that could affect a transmission grid for a particular area. In order to participate in a demand response program, a user must agree to participate and certain criteria must be met based on the particular demand response program and demand response event. Electric vehicles (EVs) can benefit from demand response programs since EVs have communication capabilities to receive and act on demand response events. However, EVs have unique challenges to participate and commit to demand response events because of their mobility and charging requirements.

BRIEF DESCRIPTION

According to one aspect, a computer-implemented method for aggregating electric vehicle loads for demand response events that includes receiving a demand response (DR) event request from a utility system indicative of a DR event for an area is provided. The DR event request includes at least one event parameter for participation in the DR event. The method includes determining a first original equipment manufacturer (OEM) DR event load based on the DR event request and charging data received from electric vehicles associated with a first OEM. The method includes comparing the first OEM DR event load to the at least one event parameter, and upon determining the first original OEM DR event load does not meet the at least one event parameter, aggregating charging data from electric vehicles associated with a second OEM with the first OEM DR event load to determine an aggregated DR load. The method includes comparing the aggregated DR event load to the at least one event parameter and, upon determining the aggregated DR event load meets the at least one event parameter, transmitting the DR event request to electric vehicles associated with the first OEM and the second OEM identified to participate in the demand response event.

According to another aspect, a system for aggregating electric vehicle loads for demand response events that includes a first original equipment manufacturer (OEM) server for receiving charging data from electric vehicles associated with a first OEM is provided. The system includes a processor operably connected for computer communication to the first OEM server. A demand response (DR) event module of the processor receives a DR event request from a utility system. The DR event request is indicative of a DR event for an area. The DR event request includes at least one event parameter for participation in the DR event. An aggregation module of the processor determines a first OEM DR event load based on the DR event request and charging data from the first OEM server. The aggregation module compares the first OEM DR event load to the at least one event parameter, and upon determining the first OEM DR event load does not meet the at least one event parameter, the aggregation module of the processor transmits the first OEM DR event load and the DR event request to a third party aggregation server. A DR event initialization module of the processor receives from the third party aggregation server an aggregated DR event load. The aggregated DR event load is based on aggregated charging data from electric vehicles associate with a second OEM and the first OEM DR event load. The DR event initialization module compares the aggregated DR event load to the at least one event parameter, and upon determining the aggregated DR event load meets the at least one event parameter, the DR event initialization module transmits the DR event request to electric vehicles associated with the first OEM and the second OEM identified to participate in the DR event.

According to a further aspect, a non-transitory computer-readable storage medium storing instructions that, when executed by a computer, causes the computer to perform a method is provided. The method includes receiving a demand response (DR) event request from a utility system indicative of a DR event for an area. The DR event request includes at least one event parameter for participation in the DR event. The method includes determining a first original equipment manufacturer (OEM) DR event load based on the DR event request and charging data received from electric vehicles associated with a first OEM. The method includes comparing the first OEM DR event load to the at least one event parameter to determine whether the first OEM DR event load meets the at least one event parameter. Upon determining the first OEM DR event load does not meet the at least one event parameter, the method includes aggregating charging data from electric vehicles associate with a second OEM with the first OEM DR event load to determine an aggregated DR event load. The method includes transmitting the DR event request to electric vehicles associated with the first OEM and the second OEM identified to participate in the DR event.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 4 illustrates exemplary data tables for each original equipment manufacturer sever including charging data according to an exemplary embodiment; and FIG. 5 illustrates exemplary data tables including charging data and priority data according to an exemplary embodiment.

DETAILED DESCRIPTION

Figure 1:
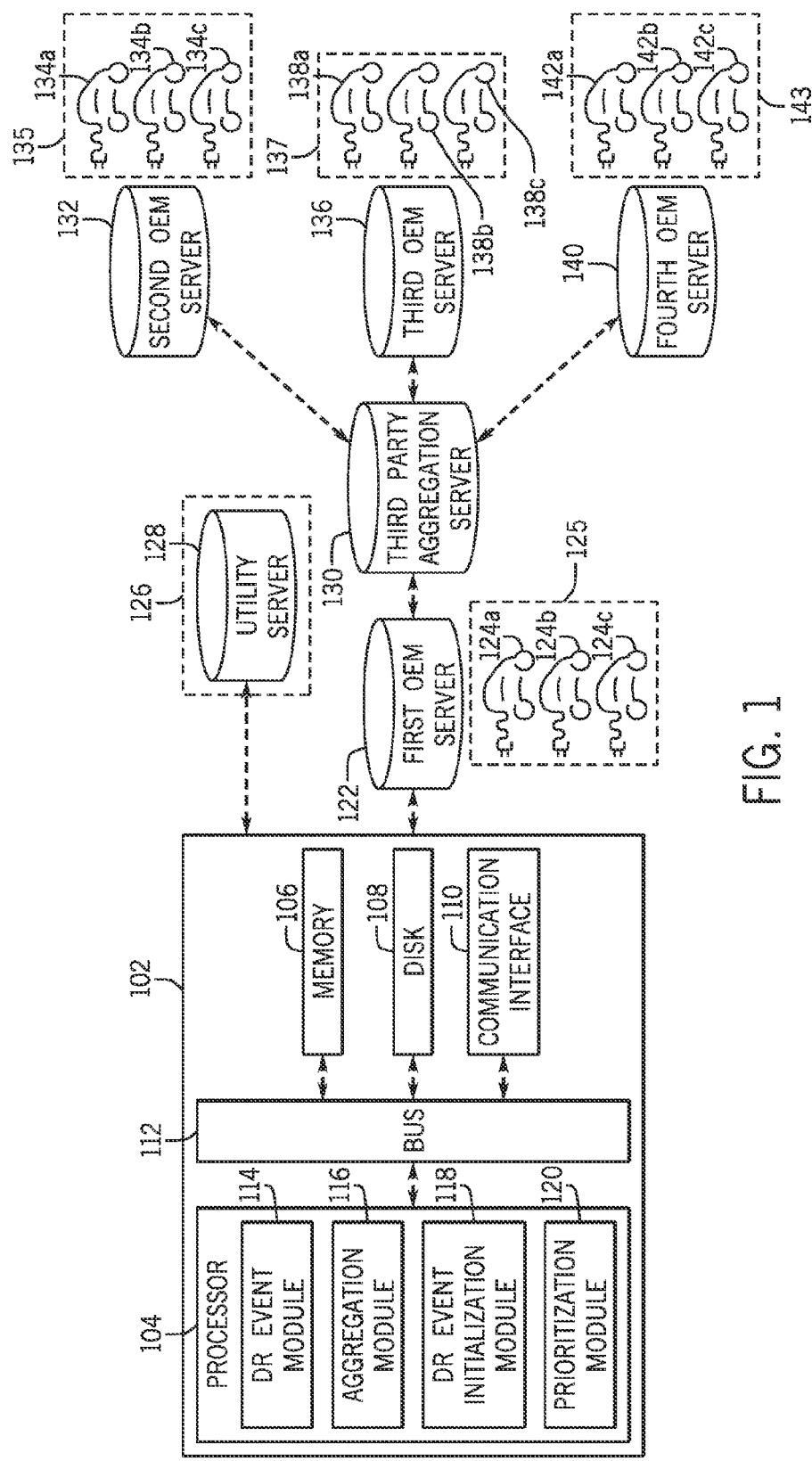
FIG. 1 is a schematic view of an operating environment implementing systems and methods for aggregating electric vehicle loads for demand response events according to an exemplary embodiment.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device," as used herein, is a computing device typically having a display screen with user input (e.g., touch, keyboard) and a processor for computing. Portable devices include, but are not limited to, handheld devices, mobile devices, smart phones, laptops, tablets, and e-readers. In some embodiments, a "portable device" could refer to a remote device that includes a processor for computing and/or a communication interface for receiving and transmitting data remotely.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

Generally, the systems and methods discussed herein are directed to aggregating electric vehicle loads for demand response events, and in particular, aggregating electric vehicle loads of electric vehicles manufactured by different original equipment manufacturers. Referring now to the drawings, wherein the showings are for purposes of illustrating one or more exemplary embodiments and not for purposes of limiting same, FIG. 1 is a schematic diagram of an operating environment 100 implementing systems and methods for aggregating electric vehicle loads for demand response events according to an exemplary embodiment. The components of environment 100, as well as the components of other systems, hardware architectures, and software architectures discussed herein, can be combined, omitted, or organized into different architectures for various embodiments.

In the illustrated embodiment of FIG. 1, the environment 100 includes a computing device 102 with provisions for processing, communicating, and interacting with various components of the computing device 102 and other components of the environment 100. In one embodiment, the computing device 102 is located and operated by a first original equipment manufacturer (OEM). In another embodiment, the computing device 102 is located and operated by a utility system (e.g., a utility system 126). It is appreciated that the computing device 102 or components of the computing device 102 can be implemented with other OEMs, a portable device operated by an electric vehicle owner (not shown), a telematics unit of an electric vehicle (not shown), or a charging station (not shown) coupled to an electric vehicle.

Generally, the computing device 102 includes a processor 104, a memory 106, a disk 108, and a communication interface 110. Each of these components are operably connected for computer communication via a bus 112 and/or other wired and wireless technologies. The communication interface 110 provides software and hardware to facilitate data input and output between the components of the computing device 102 and other components, networks, and data source within the environment 100. The components shown in FIG. 1 can each be operably connected for computer communication facilitated by various wired and wireless technologies. For example, computer communication can be facilitated by a network (not shown), a cellular data network of the computing device 102, Wi-Fi networks and connected networks from each of the electric vehicles and portable devices (not shown), among others. Additionally, the processor 104 includes a demand response (DR) event module 114, an aggregation module 116, a DR event initialization module 118, and a prioritization module 120. Each of these components of the processor 104 are suitable for providing systems and methods for aggregating electric vehicle loads for demand response events facilitated by the components of the environment 100.

The computing device 102 is also operable operably connected for computer communication (e.g., via the bus 112 and/or the communication interface 110) to a first original equipment manufacturer (OEM) server 122. The first OEM server 122 receives charging data from electric vehicles associated (i.e., manufactured) with a first OEM. For example, in FIG. 1, electric vehicles 124a, 124b, and 124c are associated with a first OEM 125. In one embodiment, the first OEM server 122 receives charging data from electric vehicles associated with the first OEM 125 upon every ignition cycle of the electric vehicles. In another embodiment, the first OEM server 122 receives charging data from electric vehicles associated with the first OEM 125 upon the electric vehicles connecting to a charging station (e.g., a "smart" charging station with connectivity capabilities).

Charging data can be transmitted to the first OEM server 122 from the electric vehicle (e.g., via a telematics control unit of the electric vehicle (not shown)), a portable device (not shown) associated with the electric vehicle (e.g., in possession of an owner of the electric vehicle), or a charging station (not shown) coupled to the electric vehicle. Further, charging data can be transmitted and/or received at predetermined periodic intervals. Additionally, charging data can be stored on board the electric vehicles (e.g., at a storage device (not shown)) and transmitted and/or received by the first OEM server 122.

Charging data generally can include, charging, availability, accessibility data or information related to the charging of electric vehicles (e.g., electric vehicles 124a, 124b, and 124c), information related to charging stations (not shown) coupled to the electric vehicles, and information related to the batteries (not shown) of the electric vehicles. More specifically, charging data can include, but is not limited to: an electric vehicle identifier, an OEM identifier, a charging station identifier, a charging station location, an electric vehicle position (e.g., latitude/longitudinal coordinates from a position determination device (not shown) of the electric vehicle), a battery type, a battery state of charge, a charge level, an estimated charge time, a charge amount, user charging preferences, electric vehicle charging schedule and/or patters, price information, time of use (TOU) rates, whether the charging station is networked (private) or non-networked (public), subscription fees or membership information for a particular charging station and network memberships of the electric vehicle.

Referring again to the embodiment shown in FIG. 1, the computing device 102 is also operably connected for computer communication (e.g., via the bus 112 and/or the communication interface 110) to a utility system 126 that can include a utility server 128. The utility system 126 manages a power grid for a particular area and determines parameters for demand response programs and demand response events. The computing device 102 can receive a demand response request from the utility system 126.

In the embodiment shown in FIG. 1, the first OEM server 122 is operably connected for computer communication to a third party aggregation server 130. As will be described in more detail herein, the first OEM server 122 can transmit charging data (e.g., a first OEM DR event load) and a demand event request to the third party aggregation server 130. The third party aggregation server 130 is operably connected for computer communication to one or more other original equipment manufacturer (OEM) servers. For example, in FIG. 1, the third party aggregation server 130 is operably connected for computer communication to a second OEM server 132, a third OEM server 136, and a fourth OEM server 140.

Similar to the first OEM server 122 discussed above, the second OEM server 132 receives charging data from electric vehicles associated (i.e., manufactured) with a second OEM. For example, in FIG. 1, electric vehicles 134a, 134b, and 134c are associated with a second OEM 135. The third OEM server 136 receives charging data from electric vehicles associated (i.e., manufactured) with a third OEM. For example, in FIG. 1, electric vehicles 138a, 138b, and 138c are associated with a third OEM 137. Further, the fourth OEM server 140 receives charging data from electric vehicles associated (i.e., manufactured) with a fourth OEM. For example, in FIG. 1, electric vehicles 142a, 142b, and 142c are associated with a fourth OEM 143. The embodiments discussed herein can include any number of electric vehicles, OEMs, or OEM servers. Each OEM associated with each server is a different OEM. As an illustrative example, the first OEM server 122 can be associated with the OEM Honda, the second OEM server 132 can be associated with the OEM Toyota, the third OEM server 136 can be associated with the OEM Ford, and the fourth OEM server 140 can be associated with the OEM Kia.

The third-party aggregation server 130, in some embodiments, can aggregate charging data from one or more OEM servers (e.g., the second OEM server 132, the third OEM server 136, and the fourth OEM server 140). As will be discussed in further detail herein, the aggregated charging data can be used to identify electric vehicles from other OEMs to participate in a demand response event based on electric vehicles from the first OEM identified to participate in the demand response event. Thus, collectively, several OEMs can participate in the DR event.

The system shown in FIG. 1 will now be described in operation according to an exemplary embodiment. As discussed above, the system includes the first OEM server 122 for receiving charging data from electric vehicles associated with a first OEM 125 (e.g., electric vehicles 124a, 124b, and 124c). The system also includes the computing device 102 with the processor 104, the processor 104 operably connected for computer communication to the first OEM server 122.

The demand response (DR) event module 114 of the processor 104 receives a DR event request from the utility system 126. The DR event request is indicative of a DR event for an area and the DR event request includes at least one event parameter for participation in the DR event. The DR event request can be generated by the utility system 126. The DR event request can include a set of rules and requirements (e.g., event parameters) for participation in the DR event. The DR event request can also include rate information and incentives for participating in the DR event. For example, a DR event request can include, but is not limited, to the following parameters: event type, an area (e.g., a service area/territory), temporal information (e.g., date, time for participation), rate information, minimum reduction load, and maximum reduction load, and duration of event.

In one embodiment, the at least one event parameter of the DR event request is a minimum reduction load determined by the utility system. As an illustrative example, the utility system 126 can determined that a minimum reduction load of 50 kW is required for one hour in an area to prevent overload of a grid for the area. Accordingly, the aggregation module 116 of the processor 104 determines a first OEM DR event load based on the DR event request and charging data from the first OEM server 122. In one embodiment, the aggregation module 116 queries the first OEM server 122 with at least one event parameter of the DR event request to determine which electric vehicles are eligible to participate in the DR event.

As an illustrative example, an exemplary DR event request can include the following event parameters: a service area equal to service area one, a minimum reduction load equal to 50 kW, and duration of one hour. The aggregation module 116 can generate a query based on one or more of the DR event request event parameters. As an illustrative example, the aggregation module 116 can generate a query including an area equal to service area one. The aggregation module 116 can execute said query on the first OEM server 122. The first OEM server 122 returns charging data from electric vehicles associated with the first OEM 125 that meet the query. For example, FIG. 4 illustrates a set of exemplary data tables including charging data for each OEM according to an exemplary embodiment. For example, table 402 illustrates exemplary charging data from the first OEM server 122. Upon executing said query on the first OEM server 122, the first OEM server returns rows 2 and 3 for electric vehicles 124b and 124c located in service area one.

Although the table 402 includes position information identifying a specific service area, in some embodiments, the position information can include position coordinates (e.g., latitude, longitude) of the electric vehicle. In this embodiment, the query can include coordinates encompassing the specific service area. In another embodiment, the aggregation module 116 can determine which service area the electric vehicle is located in based on the position coordinates.

Based on the charging data (e.g., returned from the query discussed above), the aggregation module 116 determines a first OEM DR event load. In this example, the first OEM DR event load is an energy load amount that can be reduced on the grid for an area based on the charging data of one or more electric vehicles associated with the first OEM 125. As an illustrative example, the aggregation module 116 can determine the first OEM DR event load as 21 kWh based on charging data from electric vehicles 124b (i.e., charging amount 12 kWh) and 124c (i.e., charging amount 9 kWh). Electric vehicles 124b and 124c are therefore identified by the aggregation module 116 as participants in the demand response event.

The aggregation module 116 compares the first OEM DR event load to the at least one event parameter of the DR event. Referring again to the illustrative example, the aggregation module 116 compares the first OEM DR event load of 21 kWh to the minimum reduction load of 50 kWH (e.g., at least one event parameter of the DR event request). Upon determining the first OEM DR event load does not meet the at least one event parameter, the aggregation module 116 of the processor 104 transmits the first OEM DR event load and the DR event request to the third party aggregation server 130.

Referring again to the illustrative example, the first OEM DR event load of 21 kWh does not meet the minimum reduction load of 50 kWh to participate in the DR event. Accordingly, the aggregation module 116 transmits the first OEM DR event load and the DR event request to the third party aggregation server 130. In some embodiments, the aggregation module 116 can also transmit vehicle identification information for those electric vehicles determined to participate in the DR event. Further, in some embodiments, the aggregation module 116 can transmit vehicle location data (e.g., coordinates, service area/territory location), battery state of charge, battery pack information, charge status (e.g., charging, not charging), remaining charge amount, remaining charge time, charge level). Accordingly, the information exposed to third parties is minimized.

The DR event initialization module 118 of the processor 104 receives from the third party aggregation server 130 an aggregated DR event load. The aggregated DR event load is based on aggregated charging data from electric vehicles associate with a second OEM and the first OEM DR event load. For example, the third party aggregation server 130 queries one or more different OEM servers (e.g., the second OEM server 132, the third OEM server 136, and the fourth OEM server 140) with event parameters from the DR event request. As an illustrative example, the third party aggregation server 130 can generate a query for electric vehicles with an area equal to service area one, based on the DR event request. The third party aggregation server 130 can execute said query on the second OEM server 132 and the second OEM server 132 returns charging data from electric vehicles associated with the second OEM that meet the query. For example, referring again to FIG. 4, table 404 illustrates exemplary charging data from the second OEM server 132. Upon executing said query on the second OEM server 132, the first OEM server returns rows 2 and 3 for electric vehicles 134b and 134c located in a service area one.

The third party aggregation server 130 receives charging data from electric vehicles associated with the other OEMs that meet the query. In one embodiment, the third party aggregation server 130 can transmit the charging data from electric vehicles associated with the other OEMs that meet the query to the DR event initialization module 118. Based on this charging data and the first OEM DR event load, DR event initialization module 118 determines an aggregated DR event load for the area. More specifically, the DR event initialization module 118 determines the aggregated DR event load based on a difference between the at least one event parameter and the first OEM DR event load. Returning to the illustrative example, the minimum reduction load (e.g., the at least one event parameter) is 50 kWh and the first OEM DR event load is 21 kWh. To participate in the DR event, an event load of at least 29 kWh is needed. Accordingly, the DR event initialization module 118 aggregates charging data from eligible electric vehicles of different OEMs to combine with the first OEM DR event load and meet the minimum reduction load of the DR event. In other embodiments, the third party aggregation server 130 can determine the aggregated DR event load and transmit the aggregated DR event load to the DR event initialization module 118.

Returning to the illustrative example, the DR event initialization module 118 can determine a second OEM DR event load is 34 kWh based on charging data from electric vehicles 134b (i.e., charging amount 20 kWh) and 134c (i.e., charging amount 14 kWh). Electric vehicles 134b and 134c are therefore identified by the DR event initialization module 118 as participants in the demand response event. Accordingly, in this embodiment, the DR event initialization module 118 determines the aggregated DR event load as 55 kWh by combining the first OEM DR event load and the second OEM DR event load.

The DR event initialization module 118 compares the aggregated DR event load to the at least one event parameter. Referring again to the illustrative example, the DR event initialization module 118 compares the aggregated DR event load of 55 kWh to the minimum reduction load of 50 kWh (e.g., at least one event parameter of the DR event request). Upon determining the aggregated DR event load meets the at least one event parameter, the DR event initialization module 118 transmits the DR event request to electric vehicles associated with the first OEM and the second OEM identified to participate in the DR event. Thus, referring to the illustrative example, since the aggregated DR event load meets the at least one event parameter, the DR event initialization module 118 transmits the DR event request to electric vehicles 124b, 124c, 134b and 134c (e.g., electric vehicles associated with the first OEM 125 and the second OEM 135 identified to participate in the DR event).

In one embodiment, the DR event initialization module 118 of the processor 104 further transmits a confirmation request to the electric vehicles associated with the first OEM and the second OEM identified to participate in the DR event. The confirmation request can be presented to an owner of the electric vehicles, via, for example an in-vehicle display (not shown), a portable device associated (not shown) with the electric vehicle, or a charging station (not shown) coupled to the electric vehicle. This allows the owner of the electric vehicle to confirm participation in the DR event.

In response to the confirmation request, the DR event initialization module 118 receives a confirmation response from the electric vehicles associated with the first OEM 125 and the second OEM 135. If the DR event initialization module 118 receives a confirmation response from each electric vehicle associated with the first OEM 125 and the second OEM 135 authorizing the DR event, the DR event initialization module 118 transmits the DR event request to electric vehicles associated with the first OEM 125 and the second OEM 135 identified to participate in the DR event.

However, in some embodiments, the electric vehicles associated with the first OEM and the second OEM identified to participate in the DR event may decline participation in the DR event. As such, the DR event initialization module 118 can update the aggregated DR event load based on the confirmation response. As an illustrative example, the DR event initialization module 118 receives a confirmation response authorizing the DR event from electric vehicles 124b, 124c, and 134b. The DR event initialization module 118 receives a confirmation response declining the DR event from electric vehicle 134c. The DR event initialization module 118 therefore determines an updated aggregated DR event load based on the charging data of electric vehicles 124b, 124c, and 134b. The DR event initialization module 118 can transmit the updated aggregated DR event load to the third party aggregation server 130 and the third party aggregation server 130 can determine an aggregated DR event load based on the updated aggregated DR event load and charging data aggregated from one or more OEM servers as discussed above.

In a further embodiment, the prioritization module 120 of the processor 104 prioritizes the electric vehicles associated with the first OEM 125 and the second OEM 135 identified to participate in the DR event according to a state of charge of the electric vehicles. In some situations, an owner of an electric vehicle can commit to participate in the DR event, stop charging the electric vehicle, but may suddenly start charging the electric vehicle again. To ensure the minimum load reduction committed to the utility system 126 is maintained, the prioritization module 120 can prioritize vehicles to participate in the DR event based on a state of charge of each vehicle. Accordingly, in one embodiment, the prioritization module 120 determines a priority level for each of the electric vehicles associated with the first OEM 125 and the second OEM 135 identified to participate in the DR event according to a state of charge of the electric vehicles.

In some embodiments, the priority level is a numerical or other kind of value for distinguishing between two or more priority states. For example, the priority level can be given as a percentage, a value between 1 and 10, a non-numerical value, a discrete state, a discrete value, a continuous value, among others. In one embodiment, a higher priority level is given to vehicles with a higher state of charge. Referring to FIG. 5, and with reference to the illustrative example above, a data table 502 illustrates charging data for the electric vehicles associated with the first OEM 125 and the second OEM 135 identified to participate in the demand response event. The data table 502 could be stored at the third-party aggregation server 130, the utility server 128, or the memory 106. As shown in the table, a higher priority level is assigned to electric vehicles with a higher state of charge. In this embodiment, transmitting the DR event request to electric vehicles associated with the first OEM and the second OEM identified to participate in the demand response event also includes transmitting a priority level associated with each electric vehicle.

Figure 2:
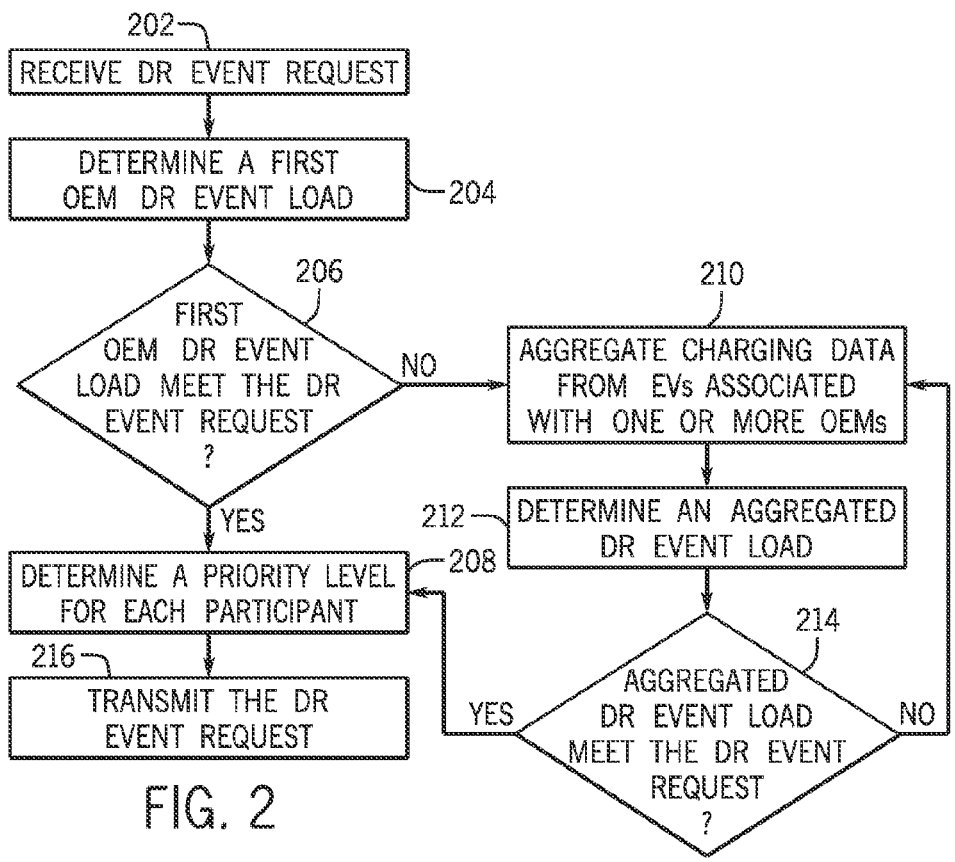
FIG. 2 is a process-flow diagram of a method for aggregating electric vehicle loads for demand response events according to an exemplary embodiment.

Referring now to FIG. 2, a method for aggregating electric vehicle loads for demand response events according to an exemplary embodiment will be discussed with reference to FIG. 1. At block 202, the method includes receiving a demand response (DR) event request from a utility system indicative of a DR event for an area. The DR event request includes at least one event parameter for participation in the DR event. As discussed above, the demand response (DR) event module 114 of the processor 104 receives a DR event request from the utility system 126. The DR event request is indicative of a DR event for an area and the DR event request includes at least one event parameter for participation in the DR event. The DR event request is generated by the utility system 126. The DR event request can include a set of rules and requirements (e.g., event parameters) for participation in the DR event.

At block 204, the method includes determining a first original equipment manufacturer (OEM) DR event load for the area based on the DR event request and charging data received from electric vehicles associated with a first OEM. As discussed above, the first OEM sever 122 receives charging data from electric vehicles associated with a first OEM 125 (e.g., electric vehicles 124a, 124b, and 124c). Similarly, the other OEM servers (e.g., the second OEM server 132, the third OEM server 126, and the fourth OEM server 140) receive charging data from electric vehicles associated with a respective OEM.

In one embodiment, the aggregation module 116 of the processor 104 determines a first OEM DR event load based on the DR event request and charging data from the first OEM server 122. As an illustrative example, a DR event request can include the following event parameters: an area equal to service area two, a minimum reduction load equal to 75 kW, and a duration equal to one hour. Accordingly, the aggregation module 116 can generate a query for electric vehicles based on one or more of the DR event request event parameters. More specifically, the aggregation module 116 can generate a query including an area equal to service area two. The aggregation module 116 can execute said query on the first OEM server 122. The first OEM server 122 returns charging data from electric vehicles associated with the first OEM 125 that meet the query. For example, referring to FIG. 4, table 402 illustrates exemplary charging data from the first OEM server 122. Upon executing said query on the first OEM server 122, the first OEM server returns row 1 for electric vehicle 124a located in the service area two.

Based on the charging data (e.g., returned from the query discussed above), the aggregation module 116 determines a first OEM DR event load. In this example, the first OEM DR event load is an energy load amount that can be reduced on the grid for an area based on the charging data of one or more electric vehicles associated with the first OEM. As an illustrative example, the aggregation module 116 can determine the first OEM DR event load as 5 kWh based on the charging data from electric vehicle 124a. Electric vehicle 124a is identified by the aggregation module 116 as a participant in the demand response event.

At block 206, the method includes comparing the first OEM DR event load to the at least one event parameter. More specifically, at block 206, it is determined if the first OEM DR event load meets the DR event request (e.g., at least one event parameter of the DR event request). If it is determined that the first OEM DR event load meets the DR event request at block 206, the method includes at block 208 transmitting the DR event request to electric vehicles associated with the first OEM identified to participate in the demand response event.

However, upon determining the first original OEM DR event load does not meet the at least one event parameter at block 206, the method includes at block 210 aggregating charging data from electric vehicles associated with a second OEM. The second OEM is a different OEM than the first OEM. In some embodiments, charging data can be aggregated from more than one different OEM. For example, the aggregation module 116 compares the first OEM DR event load of 5 kWh to the minimum reduction load of 75 kW (e.g., at least one event parameter of the DR event request) at block 206. Since 5 kWh does not meet the minimum reduction load of 75 kWh, at block 210, the aggregation module 116 transmits the first OEM DR event load and the DR event request to the third party aggregation server 130.

The third party aggregation server 130 aggregates charging data received from the second OEM server 132. In other embodiments, the third party aggregation server 130 aggregates charging data received from one or more of the other OEM servers (e.g., the second OEM server 132, the third OEM server 136, and the fourth OEM server 140). As an illustrative example, the third party aggregation server 130 can generate a query for electric vehicles with an area equal to service area two, based on the DR event request. The third party aggregation server 130 can execute said query on the second OEM server 132. The second OEM server 132 returns charging data from electric vehicles associated with the second OEM that meet the query. For example, referring again to FIG. 4, table 404 illustrates exemplary charging data from the second OEM server 132. Upon executing said query on the second OEM server 132, the first OEM server returns row 1 for electric vehicle 134a located in a service area two.

At block 212, the method includes aggregating charging data from electric vehicles associated with a second OEM with the first OEM DR event load to determine an aggregated DR load. Thus, the third party aggregation server 130 receives charging data from electric vehicles associated with the other OEMs that meet the query. In one embodiment, the third party aggregation server 130 transmits said charging data to the DR event initialization module 118, where the DR event initialization module 118 determines an aggregated DR event load based on the charging data and the first OEM DR event load. In other embodiments, the third party aggregation server 130 can determine an aggregated DR event load and can transmit the aggregated DR event load to the DR event initialization module 118 for further processing.

As discussed above, in one embodiment, the DR event initialization module 118 determines the aggregated DR event load based on a difference between the at least one event parameter and the first OEM DR event load. Returning to the illustrative example, the minimum reduction load (e.g., the at least one event parameter) is 75 kWh and the first OEM DR event load is 5 kWh. To participate in the DR event, another event load of at least 70 kWh is needed. Accordingly, the DR event initialization module 118 aggregates charging data from eligible electric vehicles of different OEMs to combine with the first OEM DR event load and meet minimum reduction load of the DR event. In this example, the DR event initialization module 118 can determine a second OEM DR event load is 13 kWh based on charging data from electric vehicle 134a (i.e., charging amount 13 kWh). The electric vehicle 134a is therefore identified by the DR event initialization module 118 as a participant in the demand response event. Accordingly, the DR event initialization module 118 determines the aggregated DR event load as 18 kWh by combining the first OEM DR event load and the second OEM DR event load.

At block 214, the method includes comparing the aggregated DR event load to the at least one event parameter. More specifically, at block 214 it is determined whether the aggregated DR event load meets the DR event request (e.g., at least one event parameter of the DR event request). For example, the DR event initialization module 118 compares the aggregated DR event load of 18 kWh to the minimum reduction load of 75 kWh (e.g., at least one event parameter of the DR event request). Since the aggregated DR event load does not meet the minimum reduction load, the method returns to block 210, where the method includes aggregating charging data from a plurality of electric vehicles associated with another OEM and the aggregated DR event load. For example, the third party aggregation server 130 aggregates charging data received from the third OEM server 136.

In other embodiments, the third party aggregation server 130 aggregates charging data from more than one OEM server. For example, the third party aggregation server 130 can query the third OEM server 136 and the fourth OEM server 140 for electric vehicles with an area equal to service area two, based on the DR event request. The third party aggregation server 130 can execute said query on the third OEM server 136 and the fourth OEM server 140. The third OEM server 136 and the fourth OEM server 140 return charging data from electric vehicles associated with the third OEM and fourth OEM that meet the query. For example, referring again to FIG. 4, a table 406 illustrates exemplary charging data from the third OEM server 136 and a table 408 illustrates exemplary charging data from the fourth OEM server 140. Upon executing said example query, the third OEM server 136 returns rows 1 and 3 for electric vehicles 138a and 138c and the fourth OEM server 140 returns rows 1 and 3 for electric vehicles 142a and 142c.

Accordingly at block 212, the DR event initialization module 118 can determine a third OEM DR event load is 30 kWh based on charging data from electric vehicles 138a (i.e., charging amount 10 kWh) and 138c (i.e., charging amount 20 kWh). The DR event initialization module 118 can also determine a fourth OEM DR event load is 28 kWh based on charging data from electric vehicles 142a (i.e., charging amount 8 kWh) and 148c (i.e., charging amount 20 kWh). Electric vehicles 138a, 138c, 142a, and 142c are therefore identified by the DR event initialization module 118 as participants in the demand response event. Accordingly, the DR event initialization module 118 determines the updated aggregated DR event load as 76 kWh by combining the previous aggregated DR event load (e.g., 18 kWh) with the third OEM DR event load (e.g., 30 kWh) and the fourth OEM DR event load (e.g., 28 kWh).

In this example, the method continues to block 214 where the DR event initialization module 118 compares the updated aggregated DR event load to the at least one event parameter. In this example, the updated aggregated DR event load as 76 kWh meets the minimum reduction load of 75 kWh. Accordingly, upon determining the aggregated DR event load meets the at least one event parameter at block 214, the method includes at block 208 determining a priority level for each elective vehicle identified to participate in the demand response event. As discussed above, in one embodiment, the prioritization module 120 of the processor 104 prioritizes the electric vehicles associated with the first OEM 125 and the second OEM 135 identified to participate in the DR event according to a state of charge of the electric vehicles. In another embodiment, and with reference to the illustrative example, the prioritization module 120 of the processor 104 prioritizes the electric vehicles associated with the first OEM 125, the second OEM 135, the third OEM 137, and the fourth OEM 143 identified to participate in a DR event.

The priority level can be based on the state of charge of the electric vehicles. For example, a higher priority level is assigned to electric vehicles with a higher state of charge. Referring to FIG. 5 with reference to the illustrative example discussed above, the data table 504 illustrates charging data for the electric vehicles associated with the first OEM 125, the second OEM 135, the third OEM 137 and the fourth OEM 143 identified to participate in the demand response event. As shown in the table, a higher priority level is assigned to electric vehicles with a higher state of charge.

At block 216, the method includes transmitting the DR event request to electric vehicles associated with the first OEM and the second OEM identified to participate in the demand response event. In the illustrative example above, the DR event initialization module 118 transmits the DR event request to electric vehicles associated with the first OEM 125, the second OEM 135, the third OEM 137 and the fourth OEM 143 identified to participate in the demand response event. Additionally, in some embodiments, the method at block 216 can include transmitting the priority level associated with each electric vehicle. In some embodiments, the DR event initialization module 118 can transmit a DR event response to the utility system 126 including the electric vehicles identified to participate in the DR event. In this example, the utility system 126 can then implement and/or transmit the DR event request to the identified electric vehicles.

Figure 3:
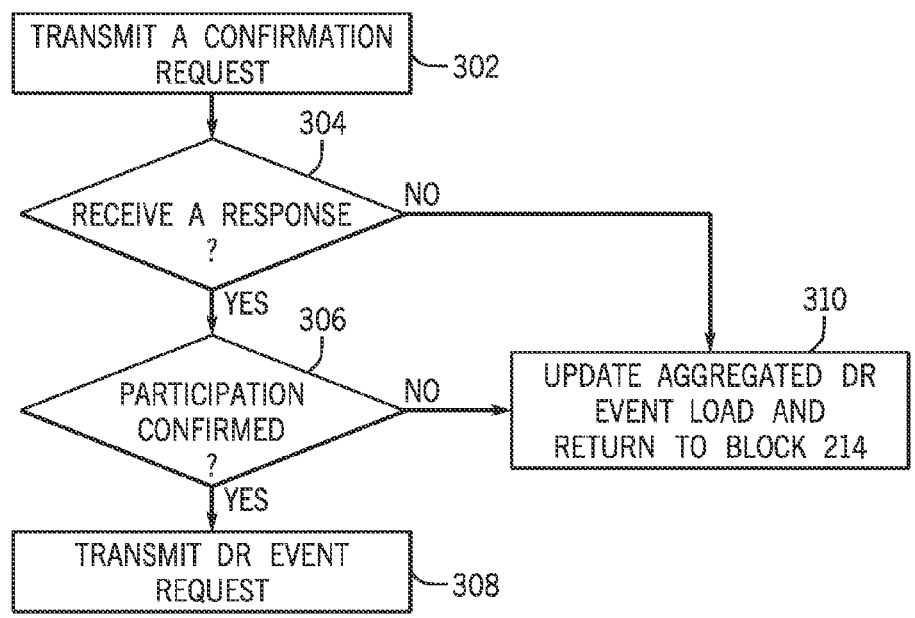
FIG. 3 is a process-flow diagram of confirming participation in a demand response event according to an exemplary embodiment.

In one embodiment, the method can also include confirming a participant for the demand response event. Referring now to FIG. 3 and with reference to FIG. 1, a method is shown for confirming participation in a demand response event according to an exemplary embodiment. At block 302, the method includes transmitting a confirmation request to the electric vehicles associated with the first OEM and the second OEM identified to participate in the DR event. In the illustrative example discussed above, the DR event initialization module 118 transmits a confirmation request to electric vehicles associated with the first OEM 125, the second OEM 135, the third OEM 137 and the fourth OEM 143 identified to participate in the demand response event. Specifically, electric vehicles 124a, 134a, 138a, 138c, 142a, and 142c. The confirmation request can be presented to an owner of the electric vehicles, via, for example an in-vehicle display (not shown), a portable device associated (not shown) with the electric vehicle, or a charging station (not shown) coupled to the electric vehicle. This allows the owner of the electric vehicle to confirm participation in the DR event.

At block 304, the method includes receiving a confirmation response. For example, the DR event initialization module 118 receives a confirmation response from the electric vehicles associated with the first OEM and the second OEM. If the DR event initialization module 118 receives a confirmation response from each electric vehicle associated with the first OEM and the second OEM, the method includes, at block 306 determining if participation has been confirmed. More specifically, it is determined if the confirmation response from each of the electric vehicle associated with the first OEM and the second OEM has been authorized and not declined. If the determination is YES, at block 308 the method includes transmitting the DR event request to electric vehicles associated with the first OEM 125 and the second OEM 135 identified to participate in the DR event, as discussed above with block 216 of FIG. 2.

However, if the determination at block 304 or block 306 is NO, the method includes at block 310, updating the aggregated DR event load based on the confirmation response. More specifically, the aggregated DR event load is adjusted based on the electric vehicles that confirmed and authorized the DR event. The DR event initialization module 118 can determine the adjusted aggregated DR event load and compare the adjusted aggregated DR event load to at least one event parameter of the DR event request to determine if the adjusted aggregated DR event load meets the at least one event parameter of the DR event request. Thus, the method can continue to block 210 of FIG. 2, to aggregate charging data from electric vehicles associated with one or more OEMs. Accordingly, the methods and systems discussed herein allow for electric vehicles from multiple different OEMs to participate in a demand response event.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for aggregating electric vehicle loads for demand response events, comprising:
   receiving a demand response (DR) event request from a utility system indicative of a DR event for an area, the DR event request including at least one event parameter for participation in the DR event;
   determining a first original equipment manufacturer (OEM) DR event load based on the DR event request and charging data received from electric vehicles associated with a first OEM;
   comparing the first OEM DR event load to the at least one event parameter;
   upon determining the first OEM DR event load does not meet the at least one event parameter, aggregating charging data from electric vehicles associated with a second OEM with the first OEM DR event load to determine an aggregated DR load;
   comparing the aggregated DR event load to the at least one event parameter; and
   upon determining the aggregated DR event load meets the at least one event parameter, transmitting the DR event request to electric vehicles associated with the first OEM and the second OEM identified to participate in the demand response event, wherein charging of the electric vehicles associated with the first OEM and the second OEM identified to participate in the demand response event is controlled according to the DR event request.

2. The computer-implemented method of claim 1, wherein the at least one event parameter is a minimum reduction load.

3. The computer-implemented method of claim 1, comprising receiving, at a first OEM server, charging data from the electric vehicles associated with the first OEM.

4. The computer-implemented method of claim 1, comprising transmitting a confirmation request to the electric vehicles associated with the first OEM and the second OEM identified to participate in the DR event.

5. The computer-implemented method of claim 1, comprising prioritizing the electric vehicles associated with the first OEM and the second OEM identified to participate in the DR event.

6. The computer-implemented method of claim 5, wherein the electric vehicles are prioritized to participate in the DR event according to a state of charge of the electric vehicles.

7. The computer-implemented method of claim 1, wherein upon determining the first OEM DR event load does not meet the at least one event parameter, transmitting the first OEM DR event load and the DR event request to a third party aggregation server.

8. The computer-implemented method of claim 7, wherein the third party aggregation server aggregates charging data from electric vehicles associated with one or more different original equipment manufacturers to determine the aggregated DR event load based on the first OEM demand response event load and the at least one event parameter.

9. The computer-implemented method of claim 1, comprising upon determining the aggregated DR event load does not meet the at least one event parameter, aggregating charging data from a plurality of electric vehicles associated with a third OEM with the aggregated DR event load.

10. A system for aggregating electric vehicle loads for demand response events, comprising:
    a first original equipment manufacturer (OEM) server for receiving charging data from electric vehicles associated with a first OEM;
    a processor operably connected for computer communication to the first OEM server;
    a demand response (DR) event module of the processor receives a DR event request from a utility system, the DR event request indicative of a DR event for an area and the DR event request including at least one event parameter for participation in the DR event;
    an aggregation module of the processor determines a first OEM DR event load based on the DR event request and charging data from the first OEM server, compares the first OEM DR event load to the at least one event parameter, and upon determining the first OEM DR event load does not meet the at least one event parameter, the aggregation module of the processor transmits the first OEM DR event load and the DR event request to a third party aggregation server; and
    a DR event initialization module of the processor receives from the third party aggregation server an aggregated DR event load, the aggregated DR event load based on aggregated charging data from electric vehicles associate with a second OEM and the first OEM DR event load, wherein the DR event initialization module compares the aggregated DR event load to the at least one event parameter, and upon determining the aggregated DR event load meets the at least one event parameter, the DR event initialization module transmits the DR event request to electric vehicles associated with the first OEM and the second OEM identified to participate in the DR event, and wherein charging of the electric vehicles identified to participate in the DR event is executed according to the DR event request as a result of receiving the DR event request from the DR event initialization module.

11. The system of claim 10, wherein the at least one event parameter is a minimum reduction load determined by the utility system.

12. The system of claim 10, wherein the first OEM server receives the charging data upon each ignition cycle of the electric vehicles associated with the first OEM.

13. The system of claim 10, wherein the DR event initialization module of the processor further transmits a confirmation request to the electric vehicles associated with the first OEM and the second OEM identified to participate in the DR event.

14. The system of claim 13, wherein in response to the confirmation request, the DR event initialization module receives a confirmation response from the electric vehicles associated with the first OEM and the second OEM and the DR event initialization module updates the aggregated DR event load based on the confirmation response.

15. The system of claim 10, comprising a prioritization module of the processor prioritizes the electric vehicles associated with the first OEM and the second OEM identified to participate in the DR event according to a state of charge of the electric vehicles.

16. A non-transitory computer-readable storage medium storing instructions that, when executed by a computer, causes the computer to perform a method, comprising:
   receiving a demand response (DR) event request from a utility system indicative of a DR event for an area, the DR event request including at least one event parameter for participation in the DR event;
   determining a first original equipment manufacturer (OEM) DR event load based on the DR event request and charging data received from electric vehicles associated with a first OEM;
   comparing the first OEM DR event load to the at least one event parameter to determine whether the first OEM DR event load meets the at least one event parameter;
   upon determining the first OEM DR event load does not meet the at least one event parameter, aggregating charging data from electric vehicles associate with a second OEM with the first OEM DR event load to determine an aggregated DR event load; and
   transmitting the DR event request to electric vehicles associated with the first OEM and the second OEM identified to participate in the DR event, wherein charging of the electric vehicles identified to participate in the demand response event is controlled according to the DR event request.

17. The non-transitory computer-readable storage medium of claim 16, comprising receiving, at a first OEM server, charging data from the electric vehicles associated with the first OEM.

18. The non-transitory computer-readable storage medium of claim 16, wherein upon determining the first OEM DR event load does not meet the at least one event parameter, transmitting the first OEM DR event load and the DR event request to a third party aggregation server.

19. The non-transitory computer-readable storage medium of claim 18, wherein the third party aggregation server aggregates charging data from electric vehicles associated with one or more different original equipment manufacturers to determine the aggregated DR event load for the area based on the first OEM DR event load and the at least one event parameter.

20. The non-transitory computer-readable storage medium of claim 19, comprising receiving the aggregated DR event load from the third party aggregation server.

* * * * *